(12) United States Patent
Batra et al.

(10) Patent No.: US 11,176,519 B2
(45) Date of Patent: Nov. 16, 2021

(54) SMART CONTRACT ADMISSION CHECK AND FAULT TOLERANCE IN A BLOCKCHAIN

(71) Applicant: International Business Machines Corporation, Armonk, NY (US)

(72) Inventors: Vishal S. Batra, New Delhi (IN); Pralhad D. Deshpande, Bangalore (IN); Praveen Jayachandran, Bangalore (IN); Palanivel A. Kodeswaran, Bangalore (IN); Venkatraman Ramakrishna, Bangalore (IN); Sayandeep Sen, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 15/349,693

(22) Filed: Nov. 11, 2016

(65) Prior Publication Data
US 2018/0137465 A1    May 17, 2018

(51) Int. Cl.
*G06Q 10/10* (2012.01)
*H04L 29/08* (2006.01)
*G06Q 50/18* (2012.01)

(52) U.S. Cl.
CPC .......... *G06Q 10/103* (2013.01); *G06Q 50/18* (2013.01); *H04L 67/104* (2013.01)

(58) Field of Classification Search
CPC .. H04L 67/104; G06Q 2220/00; G06Q 50/18; G06Q 10/103
See application file for complete search history.

(56) References Cited

U.S. PATENT DOCUMENTS

| 7,373,320 | B1  |   | 5/2008  | McDonough |
|-----------|-----|---|---------|-----------|
| 8,732,047 | B2  |   | 5/2014  | Sandholm et al. |
| 2015/0379510 | A1 |   | 12/2015 | Smith |
| 2016/0028552 | A1 |   | 1/2016  | Spanos et al. |
| 2016/0092988 | A1 |   | 3/2016  | Letourneau |
| 2016/0117471 | A1 | * | 4/2016  | Belt ............... G06F 19/3456 705/2 |

(Continued)

FOREIGN PATENT DOCUMENTS

| EP | 836307 | A2 |   | 4/1998 |          |
|----|--------|----|---|--------|----------|
| GB | 1603114 | A | * | 11/1981 | G11B 15/1808 |

OTHER PUBLICATIONS

Erik Voorhees, "It's all about that blockchain," Money and State, http://moneyandstate.com/its-all-about-the-blockchain/, Oct. 30, 2015 (Year: 2015).*

(Continued)

*Primary Examiner* — Gerardo Araque, Jr.

(57) ABSTRACT

A blockchain configuration may be used to store smart contracts. One example method of operation may include one or more of identifying a metric configuration associated with a smart contract stored in a blockchain, logging an event which is part of the metric configuration, determining whether the event supports requirements of the smart contract, determining whether a smart contract policy in the smart contract matches a system policy, and updating the smart contract on the blockchain when the requirements of the smart contract are supported by the event and the smart contract policy matches the system policy.

14 Claims, 9 Drawing Sheets

(56) References Cited

U.S. PATENT DOCUMENTS

2016/0259937 A1    9/2016   Ford et al.
2018/0089638 A1*   3/2018   Christidis .......... G06Q 10/0639

OTHER PUBLICATIONS

"The future of blockchain in 8 charts," Business Innovation, https://www.raconteur.net/business-innovation/the-future-of-blockchain-in-8-charts, Jun. 27, 2016 (Year: 2016).*

Manning, M., Sutton, M., & Zhu, J. (Oct. 29, 2016). Distributed Ledger Technology: In securities clearing and settlement: Some issues. JASSA, (3), 30-36. (Year: 2016).*

Norta, "Creation of Smart-Contracting Collaborations for Decentralized Autonomous Organizations", Springer, 2015, describes a tree-based process-view matching to establish a DAO-configuration into a contract-based collaborations and smart contract (see fig.1; section 2.2; 4.3).

* cited by examiner

650

660

SMART CONTRACT ADMISSION CHECK AND FAULT TOLERANCE IN A BLOCKCHAIN

TECHNICAL FIELD

This application relates to identifying smart contract information from a blockchain and more particularly to anticipating and monitoring transactions in the blockchain to determine whether the smart contract requirements can be enforced.

BACKGROUND

In a blockchain configuration, contractual workflows are driven by proof of compliance and fulfilled obligations. Such proof can be in the form of human attestation or automated sensors. Such proof must meet a level of assurance agreed upon by the contracting parties in order for the contract workflow to proceed smoothly and to avoid future disputes. Imprecisely formulated contract terms with ambiguity in a specification of proof levels and providers/attesters make breaches and disputes inevitable. Similarly, mechanical or logistical failures during a runtime may result in inconsistent views, failures to meet contractual obligations, and legal disputes.

SUMMARY

One example embodiment may include a method that includes at least one of identifying a metric configuration associated with a smart contract stored in a blockchain, logging an event which is part of the metric configuration, determining whether the event supports requirements of the smart contract, and updating the smart contract on the blockchain when the requirements of the smart contract are supported by the event.

Another example embodiment may include a method that includes at least one of identifying a metric configuration associated with a blockchain, determining whether the metric configuration supports requirements of a contract, and logging the contract on the blockchain when the requirements of the contract are supported by the metric configuration, determining whether a smart contract policy in the smart contract matches a system policy, and updating the smart contract on the blockchain when the requirements of the smart contract are supported by the event and the smart contract policy matches the system policy.

Another example embodiment includes an apparatus that includes at least one of a processor configured to identify a metric configuration associated with a smart contract stored in a blockchain, log an event which is part of the metric configuration, determine whether a smart contract policy in the smart contract matches a system policy, and update the smart contract on the blockchain when the requirements of the smart contract are supported by the event and the smart contract policy matches the system policy.

Another example embodiment may include a non-transitory computer readable storage medium configured to store instructions that when executed cause a processor to perform at least one of identifying a metric configuration associated with a smart contract stored in a blockchain, logging an event which is part of the metric configuration, determining whether a smart contract policy in the smart contract matches a system policy, and updating the smart contract on the blockchain when the requirements of the smart contract are supported by the event and the smart contract policy matches the system policy.

DETAILED DESCRIPTION

Figure 1:
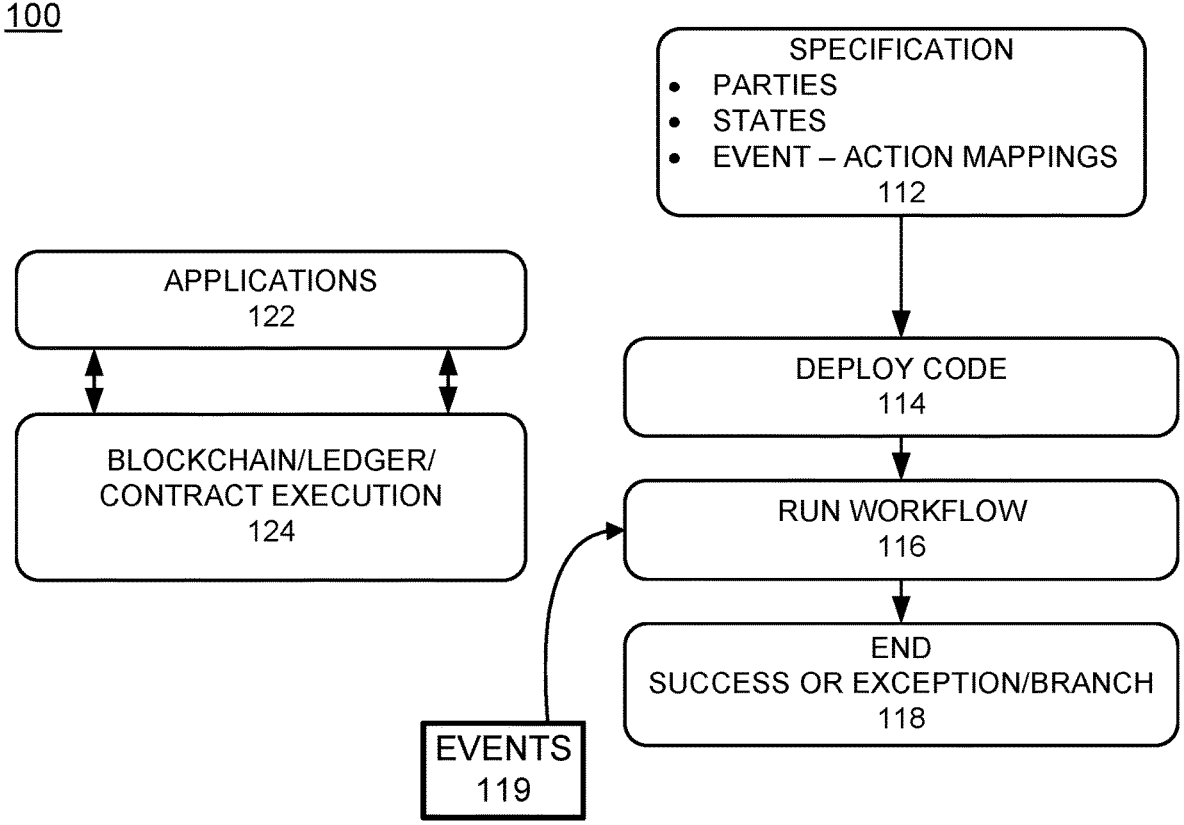
FIG. 1 illustrates a prior art smart contract lifecycle on a blockchain.

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software procedure which monitors blockchain-enforced smart contracts so faults can be anticipated and detected in advance of contract terms being executed. For example, a contract can be scanned and terms can be identified/parsed and backend system entities, such as supply chain entities, finance entities, etc., can be identified and examined before deployment on a blockchain to detect whether associated technology is sufficient to support/enforce the contractual terms. At each stage of contract execution, monitoring operations may include evaluating associated third party system technology for availability and operational validity. In the event that a mismatch between contract terms and another entity or process is discovered or identified, for example, between a contract term and a third party, an alert, alarm, notification, etc., can be created and used to identify interested parties, such as a seller, purchaser, and financer, that the standards have not been met and that the contract requires attention.

In general, smart contracts include agreements about a process or workflow and describe terms and obligations to be met by certain parties. In operation, an event-driven state machine may be used to examine contract terms. Parties may record signatures and other non-revocable data on a shared ledger. In one example, a delivery of a shipment can be attested by the receiver or by a sensor attached to the shipment. The proof must be obtained and meet an agreed-upon level of assurance that is dictated by the contract terms in the blockchain in order for the contract workflow to proceed, and to avoid potential (and future) disputes. Imprecisely formulated contract terms with ambiguity and varying degrees of proof and make breaches and disputes inevitable. Mechanical or logistical failures, which may occur, may result in inconsistent views, failure to meet contractual obligations, and legal disputes.

FIG. 1 illustrates a prior art smart contract lifecycle on a blockchain. Referring to FIG. 1, the logic diagram of the smart contract lifecycle 100 includes a main section of terms, such as a specification 112 which may include parties, states, and events which are expected to occur. The code may be deployed 114 as it parallels the applications 122 operating in the blockchain/ledger 124. The workflow 116 may include any updates, contract term execution, auditing and monitoring conducted during the life of the contract. The contract eventually expires once all terms are satisfied and the end parties have finished conducting the transaction on the blockchain. The process may end 118 with a successful contract execution when an exception/branch condition is raised which pauses the contract events 119 in the blockchain.

Figure 2:
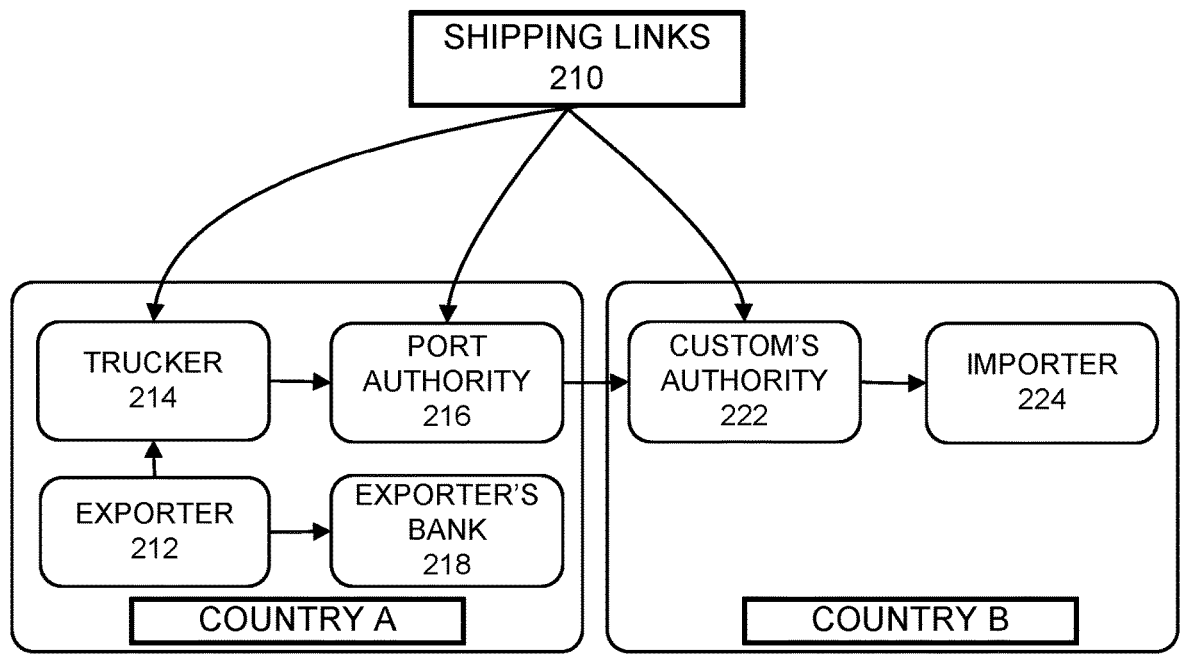
FIG. 2 illustrates an example of a smart contract operating in a blockchain according to example embodiments.

FIG. 2 illustrates an example 200 of a smart contract operating in a blockchain according to example embodiments. Referring to FIG. 2, the smart contract stored in the blockchain can include a physical infrastructure that supports the contract terms, especially when a purchase for a product is involved in the process. For instance, shipping links 210 may include entities on the shipping party end, such as an exporter 212, a trucker 214, a port authority 216 and an exporter's bank 218, for exiting a country 'A'. The receiving side may be located in another country 'B' and have a custom's authority 222 and importer business 224. Any of the entities may be part of a blockchain. Certain 'states' may be used to describe where a shipment is presently located and in whose possession the shipment is currently held. Events may include a particular shipment changing custody or being moved to a new location. This may be identified via the parties and/or sensors configured to provide information to the parties and logged in the blockchain. Certain actions may include but are not limited to a transfer of money from one entity to another, such as from an importer's account to an exporter's account, after an action is taken, such as a shipment is received, which may be confirmed, for example by a last shipping link. Another example may include a transfer of a shipment to the importer's possession after an exporter's bank receives a payment. One example of a failure or dispute may include attestation of a shipment's location by a possessor being audited as inaccurate. In this case, the parties may not abide by previously agreed upon financial commitments and the contract may need to be suspended pending mutual satisfaction (i.e., additional agreements). There are times when a change may be appropriate for a contractual obligation, however, both parties should at least be aware of the change prior to proceeding with additional contract terms. Other examples may include an unreliable or untrustworthy components that causes an event, for example, a sensor tracking a shipment location or an action taken by a party accompanying or receiving shipment. In such an event, the contract specification should be parsed to ensure that events leading to the actions in the given states meet desired assurance levels. An extract operation may identify an <event, state> list from a smart contract stored in the blockchain. The event generators may be determined along with the parties and the sensors that report changes and make attestations. Next, specified generators may be matched with assurance policies, event generators may be flagged that do not satisfy policy requirements. Also, a contract amendment may be performed to promote policy resolution and to recommend suggestions for meeting required assurance levels.

Figure 3:
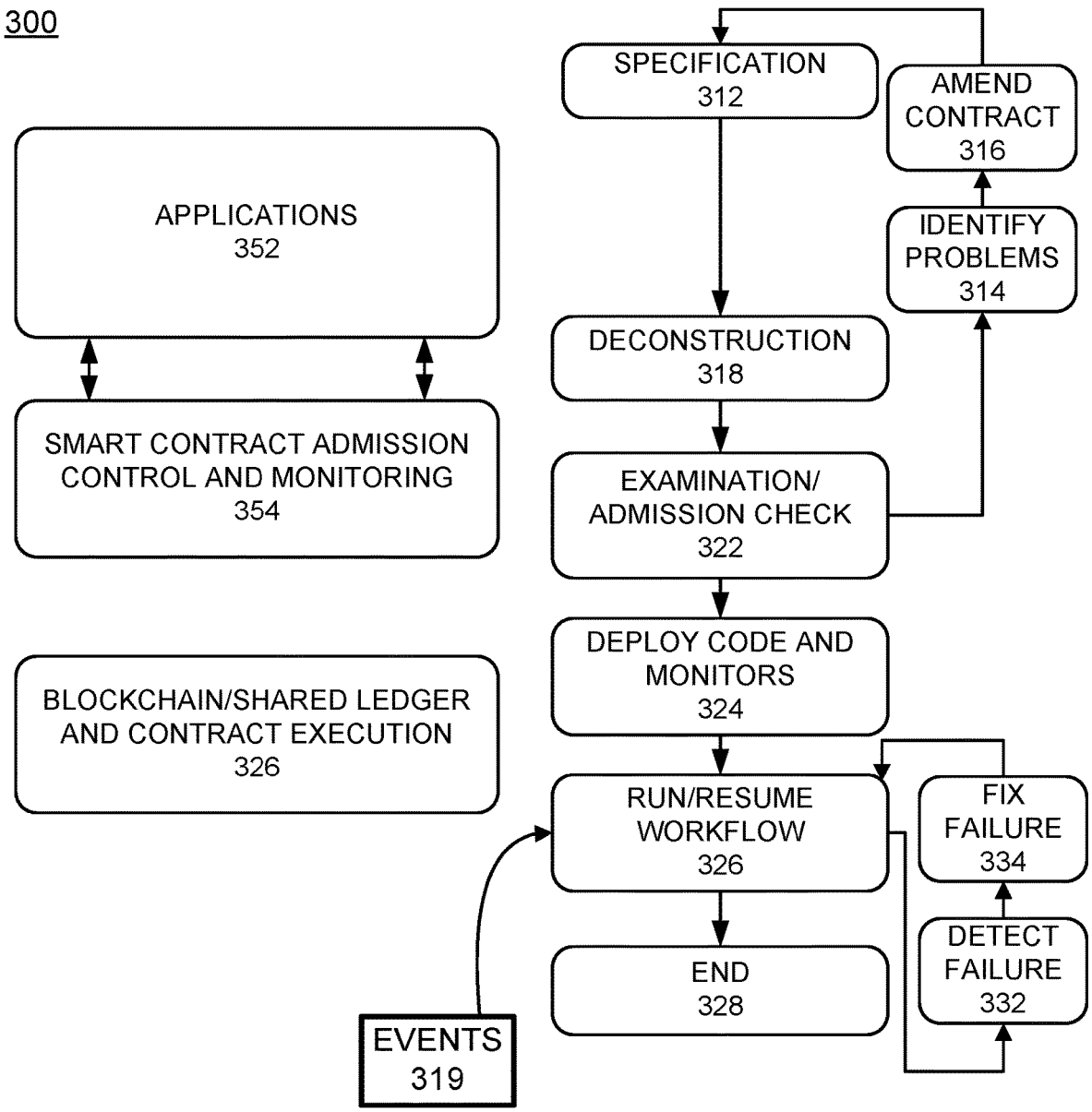
FIG. 3 illustrates a smart contract lifecycle on a blockchain with remedial support according to example embodiments.

FIG. 3 illustrates a smart contract lifecycle on a blockchain with remedial support according to example embodiments. Referring to FIG. 3, the example logic 300 includes a smart contract being executed alongside a blockchain application chain 352, blockchain contract monitoring and execution 354 and 326, respectively. In operation, the contract specification 312 is examined 322 after deconstruction 318 so the contract terms, and corresponding events and actions can be identified and monitored during contract execution. Unlike the example in FIG. 1, in one embodiment, as errors, problems, inconsistencies are identified 314, the contract can be brought to the interested parties' attention for potential contract amendment 316. The code is deployed and a monitoring operation is performed 324 to continue the contract execution procedure based on the received events 319. The workflow is resumed 326 and as events occur 319, failures can be detected 332 and fixed 334 so the contract can be revalidated and re-executed in the blockchain. The contract will eventually finish executing thus spawning the end of the contract life 328.

When the contract is initially drafted and encoded, a GPS sensor accompanying the shipment may emit events containing information about the shipment's current location and/or condition. The smart contract on the blockchain may update the shared ledger state when it receives these events. In this example, a contract is examined and matched to a system policy violation since a system policy dictates that GPS sensors are not reliable enough 314 and can be accompanied by at least one extra corroborating sensor for every location attestation event. The contract can then be amended 316 to add more GPS sensors or sensors of other kinds, such as static scanners deployed at ports to scan incoming shipments, and/or to receive information related to the sensors.

Sensors, such as GPS sensors can be periodically probed to ensure that they are not malfunctioning. If a malfunction is detected, a GPS sensor may fail to emit location information within a pre-designated period which may result in a policy violation. In one example, if there are enough redundant sensors to track shipment location to provide adequate assurance to a policy, then there is no need to raise an alarm. In the event that the failure of a GPS sensor leaves a suboptimal number of sensors in place, for example, only one extra functioning sensor in place, remedial action may be required 332, which could involve having the malfunctioning sensor fixed or replaced 334. Until remedial action is performed, the contract state will remain unchanged or may be suspended pending a result. The suspension may have a time limit which would invoke a cancellation.

Upon discovery of a contract violation (e.g., the desired assurance levels for location tracking sensors is not being met), parties may choose to deploy new sensors and/or add human verifiers. Both the detection of faults and the decision process that results in a dynamic change in contract enforcement systems and entities may be performed off the blockchain. Examples include fixing a failure in the technology system entities such as adding or removing a GPS unit, and replacing an unreliable human agent, each of which may occur off the blockchain. The events that drive a contract still remain the same, only the devices and actors that generate those events may change in the middle of the workflow.

Figure 4:
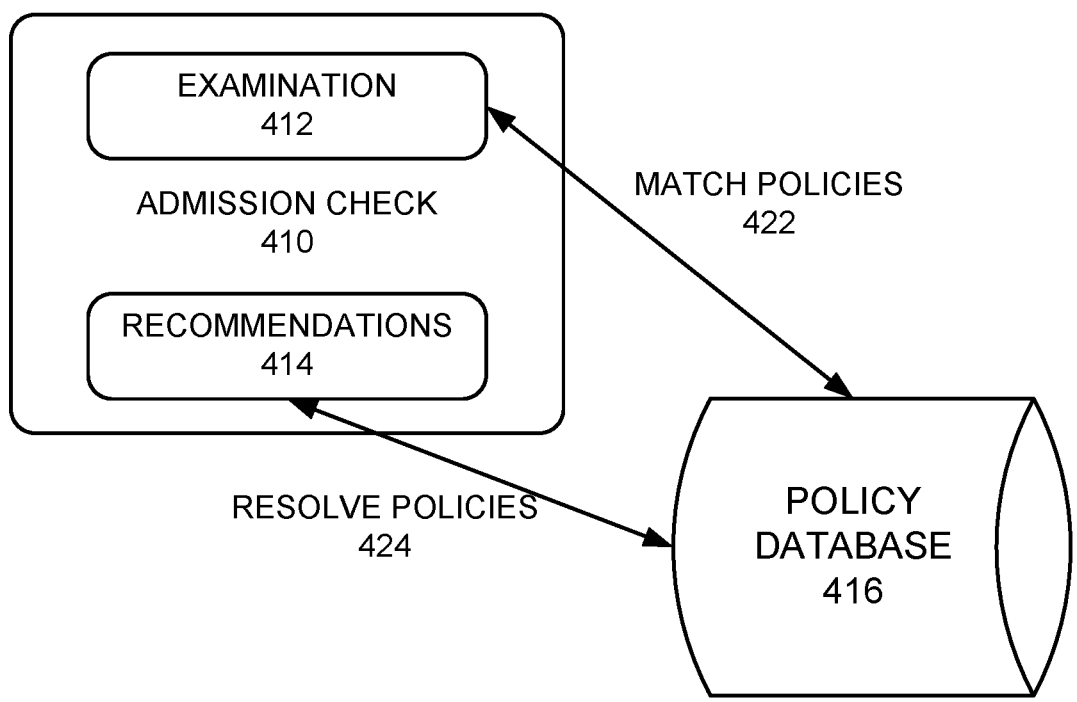
FIG. 4 illustrates a contract admission audit procedure according to example embodiments.

FIG. 4 illustrates a contract admission audit procedure according to example embodiments. Referring to FIG. 4, a policy management example 400 may include an admission check 410 being performed to include an examination 412 and recommendations 414 based on the types and number of policies in a policy database 416. As policies are matched 422 and resolved 424, the contract may be continually executed until resolution. Policies can be stored on the blockchain and/or in a separated database. Policies and a policy manager can be part of the contract specification. The policy specification may include trust information which contains maps of sensors as they relate to the product shipment and parties having certain trust levels. Also, threshold trust levels can be set which are based on a particular <event, state>, for example, a freight shipping customer may have a trust level that is not high enough for the contractual terms, or may degrade an overall trust level by a certain amount.

According to example embodiments, a 'system' refers to a device or devices which performs a task or generates information in furtherance of contract workflow (e.g., GPS sensors tracking shipment location). An 'entity' refers to an agent who performs a particular action or inputs information into the existing contract to continue the workflow (e.g., a port authority manager attesting that a particular shipment reached its destination). There are multiple platforms and programming languages one skilled in art can utilize to implement a smart contract, such as SOLIDITY for ETHEREUM or GO for IBM. Parties, states, events, and actions are described with reference to FIG. 2 for, as an example only, an international deal. Such an example can involve goods being exported from one party to another, and the financial transaction being mediated by the buyer's and seller's respective banks. Shipment progress through multiple stages and authorities (i.e., truckers, ports, and customs) can be tracked and smart contract terms can be compared. In this scenario, a smart contract would be created and encoded to include an importer which may apply for and obtain a letter of credit from a bank and present it as a promise of future payment to an exporter. The exporter can then prepare the shipment and dispatch it through a well-known carrier which may also be required by the contract terms. Once dispatched, the documents describing the contents of the shipment, their values, and shipping date, can be communicated to the importer's bank. The carrier, and the various stages through which the shipment passes, attest to the shipment having passed through certain stages, such as reaching a port, clearing customs, etc. When the goods reach their destination and the importer's bank receives the documentation from the exporter, a money transfer may then be accepted to pass to that exporter.

The smart contract code may have a workflow encoded into its structure similar to that depicted FIG. 3. The code is compiled and deployed onto the blockchain nodes, which are distributed and are under the control of the various parties described in FIG. 2, such as the importer, exporter, banks, shippers, and other authorities. The code is event-driven, in that when a party performs a certain action (e.g., an exporter dispatching goods), the blockchain nodes execute the code, for example, in parallel and update a shared ledger state through consensus procedures in the blockchain. The contract has a number of designated end states, one of which is a successful shipment followed by payment, and others where different parties fail to execute their part faithfully (e.g., shipper fails to transport goods for some reason).

In the event of a failure, notifications may be sent out to one or more parties, who can then suspend the contract while they fix the technology or resolve the issue or they can decide that the contract terms are still valid and let the process proceed. Either way, the decision will be left to the users collectively, one or more users or based on some predetermined factor. The smart contract may also self-suspend itself in the event of a direct contract violation. An example state may be an exporter that is ready to dispatch a shipment but a payment has not been cleared. An example event may include a shipment being moved from one stage to another (e.g., truck to ship, ship to port, port to customs, etc.). The event may be the trigger which causes the state and parties to be identified during a metric configuration audit. For example, an event may cause a log to be written which stores information regarding the parties and the current state along with the recent event. An action may include an importer's bank approving a letter of credit application, an exporter dispatching a shipment and obtaining documents, and/or an importer's bank paying an exporter. Metrics or a metric configuration may be a combination of parties, current states and events which have recently occurred or are about to occur. Examples of parties may include exporters, shipping entities, port authorities, manufacturers, purchasers, government entities, customs, banks, etc. The states may be a current status, such as a particular time, location, current item or possessor. The events may include a change in possession, a transfer of funds from one party to another, a new shipment status, a change in the shipment status, etc.

In one example, the exporter may not accept the terms of the importer's bank letter of credit and terminates the deal, or the exporter may fail to send a shipment in time. The shipper/carrier may fail to move the shipment to its destination port and the exporter may fail to procure valid shipping documents which forfeit its right to receive a payment. Another example may include an importer's bank failing to honor the terms of a letter of credit and not clearing payment to the exporter even after the shipment reaches its destination. Example embodiments include a method to examine a contract for imperfections and deficiencies, and also monitor progress to catch technological or human error. The blockchain itself contains records of transactions or updates to a ledger state.

Contract monitoring may be performed via XML, logic programs, etc. Monitoring code may be monitored for each event generator. The status of each generator may be periodically checked for accuracy. For example, a generator may be a location sensor and a test may be performed to determine whether a GPS sensor is up and running. Also, a periodic check may be performed to determine whether assurance levels are meeting desired thresholds of accuracy. For example, a policy may dictate that two independent attesters must report a shipment location at particular assurance level. A probe detects that various sensors, such as sensors A and B, are reporting different locations, and a human attester, for example C, reports a location identical to what A reported, and B has reported no change in location for a certain period of time. In this example, C has a lower trust (assurance) level than either A or B. Depending on a desired assurance level, faulty sensor B may or may not be flagged for remediation action, as two attesters are operational at such a time. The failures can be flagged which trigger a remediation action. As a result, an alert can be sent in the form of notifications (e-mail, SMS, etc.) to administrators (users) specified in the contract. The events/attestations can be disabled until a designated administrator fixes the problem and triggers resumption of the workflow.

Figure 5:
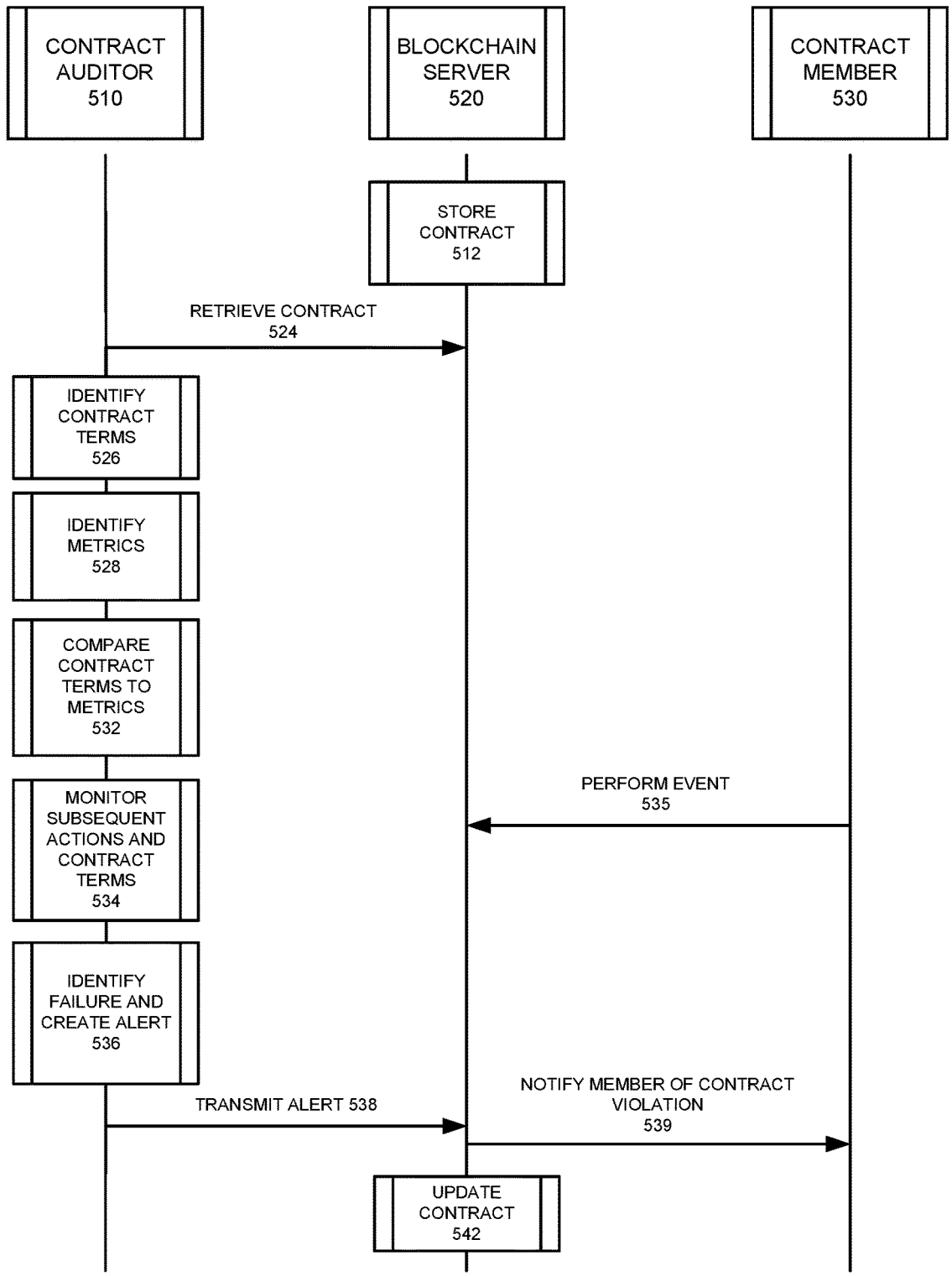
FIG. 5 illustrates a system signaling diagram of a blockchain smart contract management configuration according to example embodiments.

FIG. 5 illustrates a system signaling diagram 500 of a blockchain smart contract management configuration according to example embodiments. Referring to FIG. 5, the example includes a contract auditor entity 510, such as a monitoring entity or other entity designated or permitted to monitor contract events and actions in the blockchain. In operation, a contract is stored in the blockchain 512 on a blockchain designated server 520. An auditor may enact an operation that causes the contract to be retrieved 524 to identify the terms 526 and/or metrics 528, such as current operating conditions including any of the supply chain terms described. The contract terms are compared 532 to the metrics either instantly or over time to ensure contract compliance. Any subsequent actions or contract terms 534, which, for example, can be identified as being a potential hazard, are noted and included in an additional monitoring operation. An event may be logged 535 from a supply chain member, such as a carrier, custodian, etc. The event may be a change in plans or other event. The event may cause a failure or alert to be created 536. The alert may be transmitted 538 to the blockchain server 520 and the contract member who is registered to receive such alerts may receive a notification of the contract violation 539. Any changes or events are logged in the blockchain 542. Metrics or a metric configuration may be a combination of parties, current states and events which have recently occurred or are about to occur. Examples of parties may include exporters, shipping entities, port authorities, manufacturers, purchasers, government entities, customs, banks, etc. The states may be a current status, such as a particular time, location, current item or possessor. The events may include a change in possession, a transfer of funds from one party to another, a new shipment status, a change in the shipment status, etc.

Figure 6A:
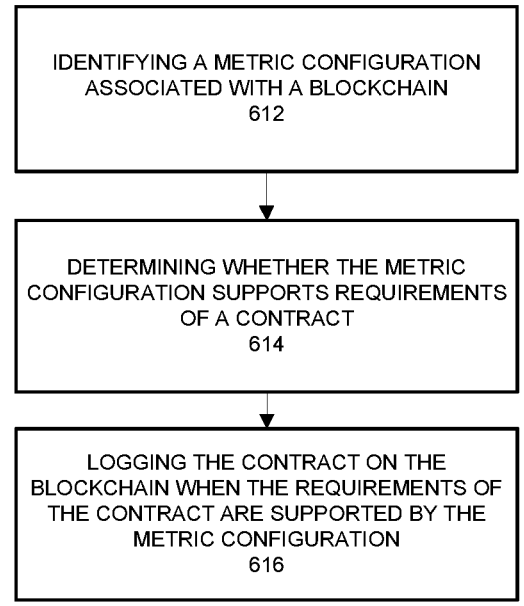
FIG. 6A illustrates a flow diagram of an example method of operation according to example embodiments.

FIG. 6A illustrates a flow diagram of an example method of operation according to example embodiments. Referring to FIG. 6A, the example method 600 may include one or more of identifying a configuration of metric associated with a blockchain 612, determining whether the metric configuration supports requirements of a contract 614, and logging the contract on the blockchain when the requirements of the contract are supported by the metric configuration 616. Additionally, the method may include identifying the requirements of the contract after the contract is logged in the blockchain, and triggering an alarm when the metric configuration does not support the requirements of the contract. Also, the method may include identifying the requirements of the contract after the contract is logged in the blockchain, and logging a transaction on the blockchain corresponding to the contract when the existing configuration supports the requirements of the contract. Additionally, the method may provide logging events on the blockchain as such events occur, and retrieving the requirements and comparing the events to the requirements responsive to the events being logged on the blockchain. Further to this example, the method may provide, responsive to comparing the events in the blockchain, identifying whether the events match the requirements of the contract, and continuing to log the events on the blockchain when the events match the requirements. As a result, when the event does not match the requirements of the contract, triggering an alarm and suspending the contract in the blockchain. The events may include one or more of a date, a time, a location, a shipping requirement, other shipping information, and a financial transaction.

Figure 6B:
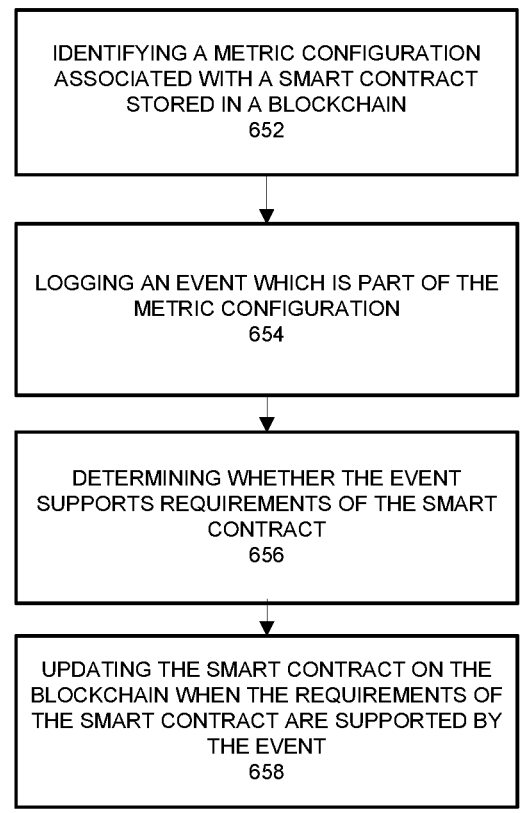
FIG. 6B illustrates another flow diagram of another example method of operation according to example embodiments.

FIG. 6B illustrates another flow diagram of another example method of operation according to example embodiments. Referring to FIG. 6B, the example method 650 includes one or more of identifying a metric configuration associated with a smart contract stored in a blockchain 652, logging an event which is part of the metric configuration 654, determining whether the event supports requirements of the smart contract 656 and updating the smart contract on the blockchain when the requirements of the smart contract are supported by the event 658. In this example, certain portions of the metric configuration may be acceptable in the smart contract while others may be impermissible and may require an alert or alarm to notify the parties. The event may serve as the trigger which causes the metric configuration to be identified and compared to the smart contract information.

Figure 6C:
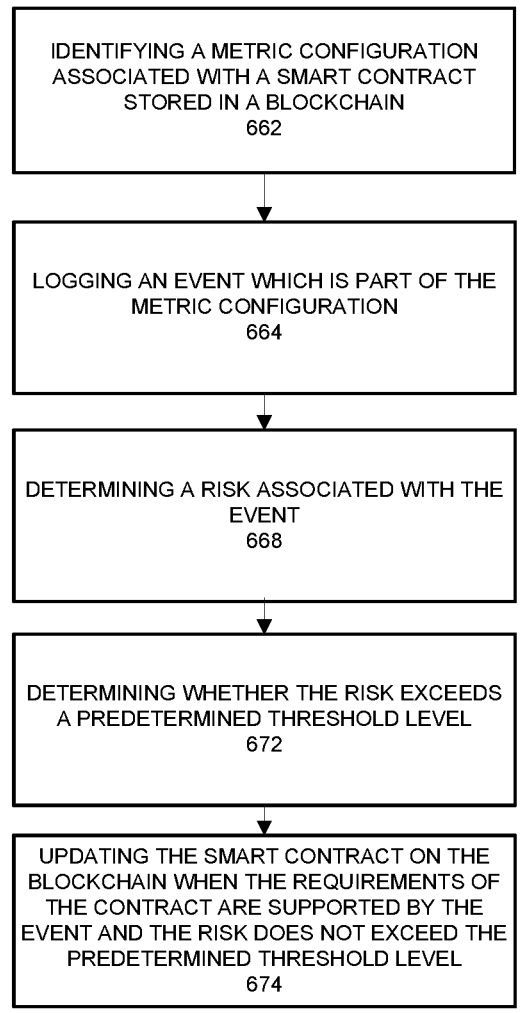
FIG. 6C illustrates another flow diagram of another example method of operation according to example embodiments.

FIG. 6C illustrates a method 660 that includes one or more of identifying a metric configuration associated with a smart contract stored in a blockchain 662, logging an event which is part of the metric configuration 664, determining a risk associated with the event 668, determining whether the risk exceeds a predetermined threshold level 672, and updating the smart contract on the blockchain when the requirements of the smart contract are supported by the event and the risk does not exceed the predetermined threshold level 674. If the risk level calculated does exceed the threshold level then the transaction may not be logged in the blockchain and instead an alert may be created and used to alert an interested party regarding the failure and why the contract is not maintained in this event. For example, the alert may include the variable which had the highest weight, the variables which were violated, etc.

One example may include permitting certain variables, such as product safety, country, shipping arrangements, bank rating, etc. Any variables may be weighted and used to form an expression based on all such variables. For example, a shipping company may be a lower weighted variable than a bank rating of a financial institution as a party to the transaction. As a result, if the contract requires a particular shipping entity and that entity is switched, this may not be a reason to void the smart contract and the relative risk level may be lower than the threshold level so the transaction may proceed accordingly. The expression used to calculate the risk level may then have multiple variables and weights V1W1, V2W2, V3W3, V4W4, etc., which are summed together and compared to a threshold level to identify if the risk is permissible and whether the blockchain transaction violates the smart contract. All the risk information and calculations may be stored in the blockchain for further review at a later time.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example network element 700, which may represent or be integrated in any of the above-described components, etc.

Figure 7:
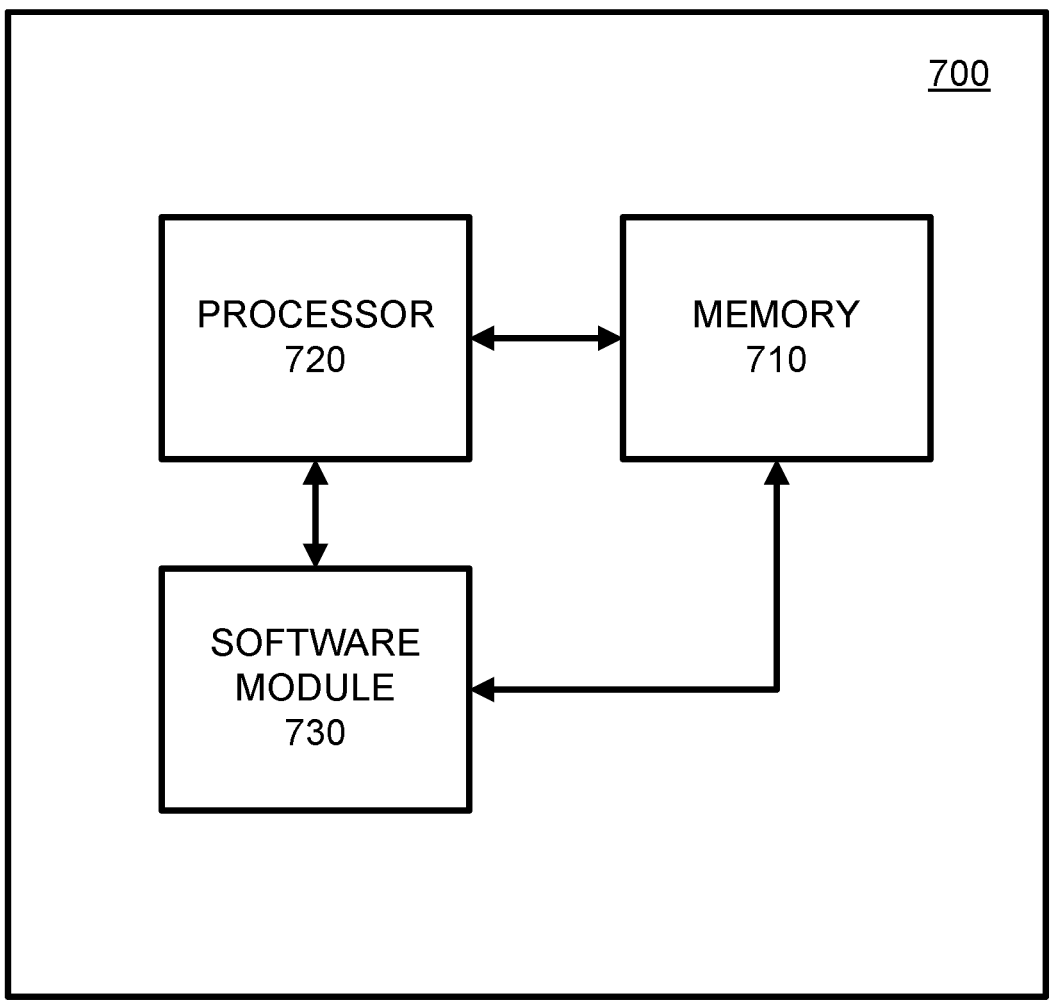
FIG. 7 illustrates an example network entity configured to support one or more of the example embodiments.

As illustrated in FIG. 7, a memory 710 and a processor 720 may be discrete components of a network entity 700 that are used to execute an application or set of operations as described herein. The application may be coded in software in a computer language understood by the processor 720, and stored in a computer readable medium, such as, a memory 710. The computer readable medium may be a non-transitory computer readable medium that includes tangible hardware components, such as memory, that can store software. Furthermore, a software module 730 may be another discrete entity that is part of the network entity 700, and which contains software instructions that may be executed by the processor 720 to effectuate one or more of the functions described herein. In addition to the above noted components of the network entity 700, the network entity 700 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
identifying, via a contract auditor, contract terms and a metric configuration associated with a smart contract stored in a blockchain;
receiving, via the contract auditor, a notification of an event logged in the blockchain, the event being part of the metric configuration and performed by a contract member;
determining, via the contract auditor, whether the event supports requirements of the smart contract;
determining, via the contract auditor, whether a smart contract policy in the smart contract matches a system policy;
identifying, via the contract auditor, that the requirements of the smart contract are supported by the event or that the smart contract policy matches the system policy;
identifying, via the contract auditor, a level of risk associated with the event based on one or more variables of the event that are different than previously agreed upon variables that are stored in the smart contract;
comparing, via the contract auditor, the identified level of risk to a threshold level of risk stored in the blockchain; and
in response to the identified level of risk being greater than the threshold level of risk, preventing the event from being stored in the blockchain, suspending execution of the smart contract on the blockchain peer, and transmitting, via the contract auditor, an alert to the blockchain indicating that the identified level of risk is greater than or equal to the threshold level of risk and an identification of the one or more variables, wherein the alert causes the blockchain to transmit a notification to the contract member.

2. The method of claim 1, further comprising:
identifying the one or more requirements of the smart contract after the smart contract is logged in the blockchain.

3. The method of claim 1, further comprising storing one or more events and states of the one or more events as pairs on the blockchain.

4. The method of claim 1, further comprising:
resuming execution of the smart contract on the blockchain peer and continuing to log additional events in the smart contract when the events match the one or more requirements of the smart contract.

5. The method of claim 1, wherein the event comprises one or more of a date, a time, a location, a shipping requirement, and a financial transaction.

6. An apparatus, comprising:
a processor configured to:
identify contract terms and a metric configuration associated with a smart contract stored in a blockchain;
receive a notification of an event logged in the blockchain, the event being part of the metric configuration and performed by a contract member;
determine whether the event supports requirements of the smart contract;
determine whether a smart contract policy in the smart contract matches a system policy;
identify that the requirements of the smart contract are supported by the event or that the smart contract policy matches the system policy;
identify a level of risk associated with the event based on one or more variables of the event that are different than previously agreed upon variables that are stored in the smart contract;
compare the identified level of risk to a threshold level of risk stored in the blockchain; and
in response to the identified level of risk being greater than the threshold level of risk, prevent the event from being stored in the blockchain, suspend execution of the smart contract on the blockchain peer, and transmit an alert to the blockchain indicating that the identified level of risk is greater than or equal to the threshold level of risk and an identification of the one or more variables, wherein the alert causes the blockchain to transmit a notification to the contract member.

7. The apparatus of claim 6, wherein the processor is further configured to:
identify the one or more requirements of the smart contract after the smart contract is logged in the blockchain.

8. The apparatus of claim 6, wherein the processor is further configured to store one or more events and states of the one or more events as pairs on the blockchain.

9. The apparatus of claim 8, wherein the processor is further configured to resume execution of the smart contract on the blockchain peer and continue to log additional events in the smart contract when the events match the one or more requirements of the smart contract.

10. The apparatus of claim 8, wherein the event comprises one or more of a date, a time, a location, a shipping requirement, and a financial transaction.

11. A non-transitory computer readable storage medium configured to store at least one instruction that when executed by a processor cause the processor to perform:
identifying, via a contract auditor, contract terms and a metric configuration associated with a smart contract stored in a blockchain;
receiving, via the contract auditor, a notification of an event logged in the blockchain, the event being part of the metric configuration and performed by a contract member;
determining, via the contract auditor, whether the event supports requirements of the smart contract;
determining, via the contract auditor, whether a smart contract policy in the smart contract matches a system policy;
identifying, via the contract auditor, that the requirements of the smart contract are supported by the event or that the smart contract policy matches the system policy;
identifying, via the contract auditor, a level of risk associated with the event based on one or more variables of the event that are different than previously agreed upon variables that are stored in the smart contract;
comparing, via the contract auditor, the identified level of risk to a threshold level of risk stored in the blockchain; and
in response to the identified level of risk being greater than the threshold level of risk, preventing the event from being stored in the blockchain, suspending execution of the smart contract on the blockchain peer, and transmitting, via the contract auditor, an alert to the blockchain indicating that the identified level of risk is greater than or equal to the threshold level of risk and an identification of the one or more variables, wherein the alert causes the blockchain to transmit a notification to the contract member.

12. The non-transitory computer readable storage medium of claim 11,
   wherein the method further comprises identifying the one or more requirements of the smart contract after the smart contract is logged in the blockchain.

13. The non-transitory computer readable storage medium of claim 11, the method further comprises storing one or more events and states of the one or more events as pairs on the blockchain.

14. The non-transitory computer readable storage medium of claim 13,
   wherein the method further comprises resuming execution of the smart contract on the blockchain peer and continuing to log additional events in the smart contract when the events match the requirements of the smart contract.

\* \* \* \* \*